United States Patent [19]

McLandrich

[11] 4,283,144
[45] Aug. 11, 1981

[54] METHOD OF FIBER INTERFEROMETRY ZERO FRINGE SHIFT REFERENCING USING PASSIVE OPTICAL COUPLERS

[75] Inventor: Matthew N. McLandrich, Carlsbad, Calif.

[73] Assignee: The United States of America as represented by the Secretary of the Navy, Washington, D.C.

[21] Appl. No.: 30,202

[22] Filed: Apr. 16, 1979

[51] Int. Cl.³ .............................................. G01C 19/64
[52] U.S. Cl. .................................................... 356/350
[58] Field of Search ............................... 356/350, 351

[56] References Cited
U.S. PATENT DOCUMENTS

| | | | |
|---|---|---|---|
| 3,332,314 | 7/1967 | Rosenthal | 356/350 |
| 4,138,196 | 2/1969 | Redman | 356/350 |

Primary Examiner—Vincent P. McGraw
Attorney, Agent, or Firm—Richard S. Sciascia; Ervin F. Johnston; Thomas Glenn Keough

[57] ABSTRACT

A method and apparatus for zero fringe shift referencing has unique application in an optical fiber interferometer gyroscope. Passive optical couplers introduce pulsed laser energy into the interferometer's main loop and a much smaller loop encircling a negligible area. An output signal from the smaller loop is representative of a zero rotation rate while the output signal from the much larger main interferometer loop is representative of an unknown rotation rate. The zero rotation rate and unknown rotation rate signals are compared and referenced so that there can be compensation for the response variation of the photodetectors or the source of laser energy to enable more accurate responsive readouts.

4 Claims, 7 Drawing Figures

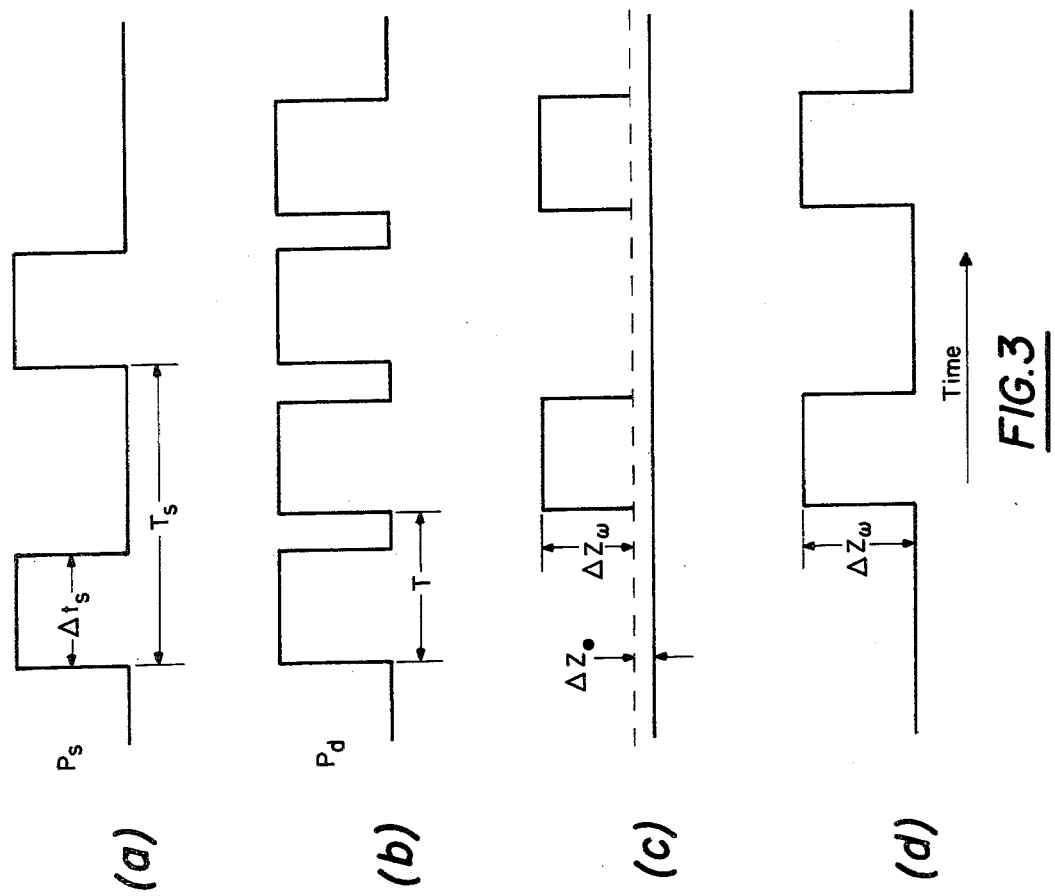
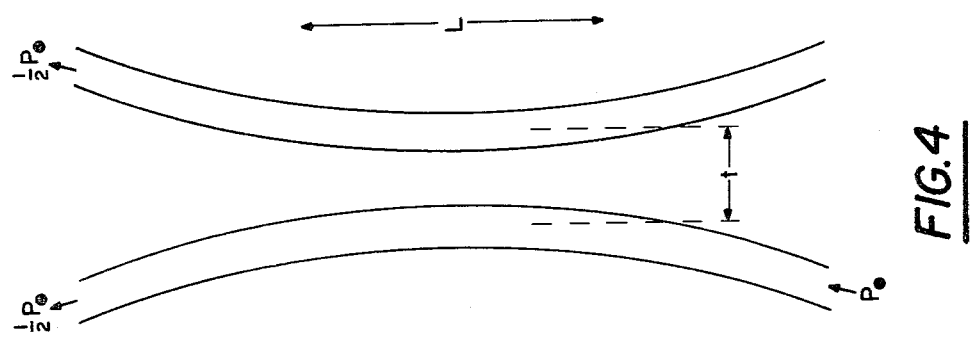

METHOD OF FIBER INTERFEROMETRY ZERO FRINGE SHIFT REFERENCING USING PASSIVE OPTICAL COUPLERS

CROSS REFERENCE TO RELATED APPLICATION

This is an improvement for the invention entitled "Three dB Single Mode Optical Fiber Interferometer Beamsplitters/Coupler" by Matthew N. McLandrich, Ser. No. 014,798 filed Feb. 26, 1979.

BACKGROUND OF THE INVENTION

Mechanical gyros, ring laser gyros, and fiber optic gyros are widely employed to provide a stable reference or a rate sensing device for navigation purposes. The fiber ring interferometer disclosed in the referenced application employs single mode optical couplers to reduce the problems associated with the ambient effects of temperature change, vibrations, shock, etc., on the heretofore employed beam-splitters and lens arrangement.

Shown as prior art in FIG. 1 of the drawings, a fiber interferometer 10 of the referenced application has a several hundred meter length single mode optical fiber 11 arranged in a ring-shaped configuration which encircles an area 12 of predetermined dimensions. A pair of beamsplitters/couplers 13 and 14 couple coherent light from a laser 15, and a pair of photodetectors 16 and 17 monitor the interference fringes attributed to changes of the rate of rotation of the interferometer.

The output of the laser is a continuous signal split into two parts by the pair of beamsplitters so that the laser energy circulates in opposite directions through the long single mode fiber. The beams are recombined by the beamsplitter/couplers and the output optical power is measured using the photodetectors. The magnitudes of the optical signals are measured at the detectors and are 180° out of phase. The measured signals are the normalized difference of the output currents of the photodetectors which provide the output signals of the interferometer.

However, effects of variation of the response of the laser, and the photodetectors, can give erroneous indications of fringe shift and hence, angular rotation. For example, the output signal could drift for a constant applied rotation rate due to photodetector and laser response changes in response to ambient temperature changes or ageing.

An existing method of determining the fringe shift due to rotation rate variation relies upon a d.c. technique which does not refer the measured signal to its zero reference level. This approach suffers from the degrading effects of 1/f noise (this noise factor increases to objectionable levels as f approaches a d.c. value).

Thus, there is a continuing need in the state-of-the-art for a technique for calibrating or otherwise determining the zero rotation rate reference levels for fiber interferometers which is capable of determining changing response in the active elements, the photodetectors and the laser.

SUMMARY OF THE INVENTION

The present invention is directed to providing a method and apparatus for zero fringe referencing a fiber interferometer gyro having its optical fiber arranged in a loop about an area of known dimensions. A source of laser energy is pulsed and the energy is coupled to effect a simultaneous bidirectional travel through the loop around the area. A splitting off of portions of the simultaneously traveling bidirectional laser energy is performed before the energy enters the loop around the area. A pair of photodetectors generate a zero rotation rate signal representative of the effects that the laser energy source response and the photodetector response have on the split off portions of the pulsed bidirectional laser energy. Sequentially, the photodetectors generate a signal which is representative of the effects the rotation of the loop, laser energy source response and photodetector response have on the pulsed bidirectional laser energy traveling through the loop. The zero rotation rate signal and the unknown rotation rate signal are referenced and appropriately processed to allow for compensation of fringe shift errors introduced by the interferometer component variations. The sequential pulsing of the laser allows the sequential processing of the zero rotation rate signal and then the unknown rotation rate signal so that a representative accurate referencing can be made.

It is a prime object of the invention to provide for improved fiber interferometer gyro performance.

Yet another object is to provide a pulsed laser electrooptically cooperating with a fiber interferometer to provide more representative readouts.

A further object is to improve the accuracy of a fiber interferometer gyro.

Another object is to improve the reliability of a fiber interferometer gyro.

Yet another object is to provide for the generation of a zero rotation rate signal for referencing an unknown rotation rate signal.

Another object is to allow for compensation of the effects of ageing of the active elements in a fiber interferometer gyro.

A still further object is to compensate for the effects of ambient thermal changes.

These and other objects of the invention will become more readily apparent from the ensuing description when taken with the accompanying sheets of drawings.

BRIEF DESCRIPTION OF THE DRAWINGS

FIGS. 3a, 3b, 3c and 3d set forth the timing and signal relationships in the invention where FIG. 3a shows a pulsed laser output $P_s$ of period $T_s$.

FIG. 3b shows power incident at photodetector, instantaneous pulse from zero reference section and pulse from signal section delayed by $T=nL/c$.

FIG. 3c shows measured fringe shift is superposition of signal fringe shift $\Delta Z_\omega$ and error fringe shift $\Delta Z$.

FIG. 3d shows $\Delta Z$ subtracted to yield true signal.

FIG. 4 shows a typical beamsplitter/coupler of the above referenced application.

DESCRIPTION OF THE PREFERRED EMBODIMENT

Figure 1:
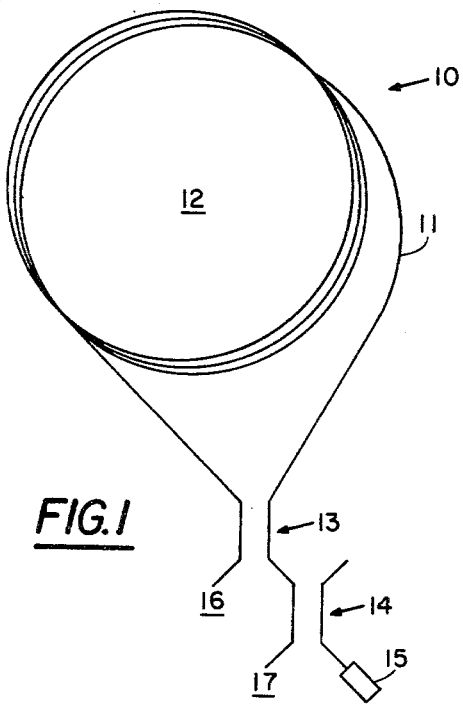
FIG. 1 depicts an advanced state-of-the-art fiber interferometer gyro labeled prior art.

Referring once again to FIG. 1 of the drawings, the state-of-the-art fiber interferometer gyro is a highly promising candidate for providing responsive indications of angular motion and rate of change of motion. It is lightweight and relatively free of the disadvantages of mechanical and ring laser gyros. However, certain limitations have become apparent, viz., variations in the laser and photodetectors' responses, change the output signals without changes in rotation rate.

Figure 2:
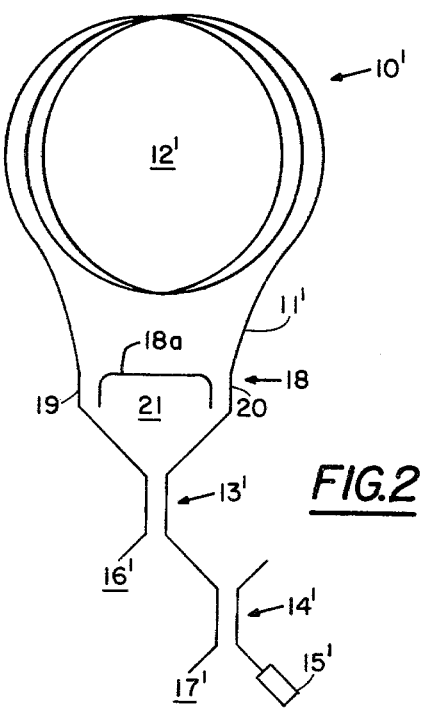
FIG. 2 schematically sets forth the improvement of the method and apparatus of this invention.

Variations of the photodetectors and the lasers' response is compensated for in the improved fiber interferometer 10' shown in FIG. 2. It to has a single mode optic fiber 11' wound in a coil about an are 12' and relies on a pair of beamsplitter/couplers 13' and 14' to deliver pulsed laser energy from a pulsed laser source 15'. The couplers enable the simultaneous bidirectional travel of pulsed laser energy through the coiled single mode fiber and the extraction of the pulses for observation or monitoring a by pair of photodetectors 16' and 17'.

A referencing section 18 is added to the fiber interferometer to provide an indication of signal response variation by the photodetectors or the laser. Pulsed laser energy is tapped into the referencing section by a pair of beamsplitter/couplers 19 and 20 which are substantially the same as 13' and 14'. All the beamsplitter/couplers are of the type disclosed in the above referenced patent application and are shown in FIG. 4 of these drawings. A length of single mode optical fiber 18a extends between the beamsplitter/couplers to encompass a negligible area 21 when compared with the size of area 12'.

Fiber interferometers of this type provide indications of a rotation rate about an axis perpendicular to the plane of the coiled fiber. When the interferometer rotates with an angular speed $\omega$ about the perpendicular axis, a fringe shift, $\Delta Z = 4(A\omega N)/(\lambda c)$ which equals $(2\omega LR)/(\lambda c)$; where A equals the area encircled by the fiber (in this case area 12'), N equals the number of loops of the fiber optic cable about area 12', $\lambda$ equals the wavelength of the pulsed laser energy, c equals the speed of light, L equals the total length of the coiled single mode optical fiber and R equals the radius of the encircled area 12'.

As the interferometer is rotated, a fringe shift results in a power variation at the detectors and can be represented by the equation: $P = P_o \cos^2 \Delta Z$ where $P_o$ equals an equivalent magnitude of power at each photodetector but out of phase with respect to each other by 180°. Therefore, by measuring the optical power, the rotation rate $\omega$ can be determined.

The negligible area 21 of the referencing section is nonresponsive to rotation of the interferometer and does not generate a rotation rate signal. The signal generated by the referencing section 18 is a function of variations of the laser and photodetector outputs. This is referred to as the zero rotation rate fringe shift referencing signal $\Delta Z_o$.

The referencing is achieved by using the optical couplers 19 and 20 to couple a small portion of the interferometer input beams into the negligible area loop 21. A zero area fringe shift $\Delta Z_o$ is generated by the photodetectors. A rotation rate signal fringe shift $\Delta Z\omega$ is created as pulsed bidirectional signals travel in the optical fiber around area 12' and reach the photodetectors. $\Delta Z\omega$ is now referenced to this zero level signal $\Delta Z_o$ and the effects of photodetector response variation and laser response variation can be compensated.

Looking to FIG. 3, the method of detection requires that laser source 15' be a pulsed laser source so that the unknown rotation rate signal $\Delta Z\omega$ and the zero rotation rate signal $\Delta Z_o$ coming from the referencing section are received at different times at the photodetectors. The time separation results from the difference in transit times for the light pulses propagating around the area 12' and the negligible area 21.

To repeat, and noting FIG. 3, the portion of the light coupled into $\Delta Z_o$ referencing section 18 arrives at the photodetectors after a time delay which is essentially zero. The pulses coupled into the $\Delta Z\omega$ signal section surrounding area 12' are delayed by a time: $T = nL/c$; where L is the length of the long fiber, n is the refractive index of the fiber core and c is the vacuum speed of light. The pulse width $\Delta T_s$ and repetition rate $1/T$ of the laser are chosen so that the $\Delta Z\omega$ and $\Delta Z_o$ pulses do not overlap.

The beamsplitter/coupler used in elements 13', 14', 19 and 20 is shown in FIG. 4. Two parallel, dielectric single mode waveguides are separated by distance t over a length L. If the parameters t and L and the index difference $\Delta n$ of the waveguide core and the surrounding medium are chosen properly, coherent exchange of energy occurs between the light beams propagating in the waveguides. The light which is incident at one of the input ports will partially couple into the second waveguide. The coupling strength, or tap ratio, is determined by the values of t, L, and $\Delta n$ and can be fixed at a given value by adjustment of these parameters. The makeup and method of manufacture of such beamsplitter/couplers are fully covered in the above referenced related application.

Obviously, many other modifications and variations of the present invention are possible in the light of the above teachings. It is therefore to be understood that within the scope of the appended claims the invention may be practiced otherwise than as specifically described.

What is claimed is:

1. A method of zero fringe referencing a fiber interferometer gyro having its single mode optical fiber arranged in a loop about an area comprising:
    energizing by pulsing a source of laser energy;
    coupling the pulsed laser energy to effect the simultaneous bidirectional travel thereof in the loop around the area;
    splitting off portions of the simultaneously traveling bidirectional pulsed laser energy before it enters the loop around the area;
    generating zero rotation rate signals representative of the effects the pulsed laser energy source response and the photodetector response have on the split off portions of the bidirectional pulsed laser energy;
    generating unknown rotation rate signals representative of the effects the rotation of the loop, pulsed laser energy source response and photodetector response have on the bidirectional laser energy traveling through the loop the generation of the zero rotation rate signals are first in repetitive sequence to the generation of the unknown rotation rate signals; and
    referencing the unknown rotation rate signals to the zero rotation rate signals to allow for responsive compensation.

2. In a fiber interferometer having its optical fiber arranged in a loop about an area and coupled to a source of laser energy for simultaneously bidirectionally passing laser energy therethrough and at least one photodetector for receiving the bidirectional laser energy and for generating representative signals, an improvement therefor is provided comprising:
    means for splitting of portions of the simultaneously traveling bidirectional laser energy before it enters the loop around the area to allow the generation of a zero rotation rate signal at least one photodetector for a subsequent referencing with an unknown rotation rate signal sequentially generated by the at least one photodetector upon receipt of the laser energy that has passed through the loop.

3. An improvement according to claim 2 in which the laser energy source is a pulsed source to assure the generation of the zero rotation rate signal and the unknown rotation rate signal in a nonoverlapping sequence.

4. An improvement according to claim 3 in which the splitting means is a pair of fiber optic beamsplitter/couplers connected to a short length of a fiber optic cable to encompass a negligible area compared to the area the loop encompasses.

* * * * *